(12) United States Patent
Mysore et al.

(10) Patent No.: US 12,273,941 B2
(45) Date of Patent: Apr. 8, 2025

(54) EFFICIENT PROCEDURES TO CREATE BLUETOOTH LE CENTRAL CONNECTION ON AN ADVERTISER

(71) Applicant: Cypress Semiconductor Corporation, San Jose, CA (US)

(72) Inventors: Manamohan D. Mysore, Ramona, CA (US); James Wihardja, Tustin, CA (US); Victor Zhodzishsky, Potomac, MD (US)

(73) Assignee: Cypress Semiconductor Corporation, San Jose, CA (US)

( * ) Notice: Subject to any disclaimer, the term of this patent is extended or adjusted under 35 U.S.C. 154(b) by 508 days.

(21) Appl. No.: 17/555,071

(22) Filed: Dec. 17, 2021

(65) Prior Publication Data

US 2023/0199872 A1    Jun. 22, 2023

(51) Int. Cl.
| | |
|---|---|
| *H04W 76/10* | (2018.01) |
| *H04W 8/00* | (2009.01) |
| *H04W 76/14* | (2018.01) |
| *H04W 84/18* | (2009.01) |

(52) U.S. Cl.
CPC .......... *H04W 76/14* (2018.02); *H04W 8/005* (2013.01); *H04W 84/18* (2013.01)

(58) Field of Classification Search
CPC . H04W 52/0219; H04W 76/14; H04W 8/005; H04W 84/18; H04W 4/80; H04W 76/10; H04W 92/18

See application file for complete search history.

(56) References Cited

U.S. PATENT DOCUMENTS

| | | | |
|---|---|---|---|
| 10,149,340 B1* | 12/2018 | Rabii | B64D 11/00153 |
| 2015/0133054 A1* | 5/2015 | Chen | H04W 4/80 |
| | | | 455/41.2 |
| 2015/0304843 A1* | 10/2015 | Hillyard | G06F 8/654 |
| | | | 726/5 |
| 2016/0269577 A1* | 9/2016 | Sato | H04W 8/005 |
| 2018/0295660 A1* | 10/2018 | Choi | H04W 76/14 |
| 2019/0327675 A1* | 10/2019 | Takeuchi | H04W 76/14 |
| 2021/0204338 A1* | 7/2021 | Han | H04W 76/14 |
| 2022/0400365 A1* | 12/2022 | Bains | H04W 4/80 |
| 2024/0147551 A1* | 5/2024 | Zhang | H04W 48/14 |

* cited by examiner

*Primary Examiner* — Cindy Trandai

(57) ABSTRACT

Disclosed are techniques for a device that wants to be a central device when creating a connection in a communication network such as Bluetooth Low Energy (BLE) to advertise information associated with a connection window to solicit a connection with a scanning peer device. When the scanning peer device receives the information, it may enter a connection as a peripheral device with the advertising device at the advertised connection window, allowing the advertising device to become the central device. Disclosed are also techniques for a device that wants to be a central device to advertise information associated with a scan window of the device to solicit a directed advertisement event from a peer device during the advertised scan window. The peer device initially scans but may advertise during the scan window as advertised to enable the central device to create a connection where the peer device becomes a peripheral device.

20 Claims, 15 Drawing Sheets

EFFICIENT PROCEDURES TO CREATE BLUETOOTH LE CENTRAL CONNECTION ON AN ADVERTISER

TECHNICAL FIELD

This disclosure generally relates to technologies for establishing connections between devices using narrow-band radios such as Bluetooth wireless technologies, and more particularly, to methods and systems for a device that advertises to create a connection as a central device with a scanning peer device that acts as a peripheral device in Bluetooth Low Energy (LE) link layer.

BACKGROUND

In Bluetooth LE connection, a device referred to as an advertiser may transmit packets on advertising channels to advertise its presence to other devices. A second device, referred to as a scanner or an initiator, may scan or listen for the advertising packets on the advertising channels. When the scanner receives advertising packets from an advertiser, the scanner may request additional information from the advertiser or may initiate a connection with the advertiser. To connect with the advertiser, the scanner may enter a connection state in the link layer to exchange data packets with the advertiser. In the connection state, the scanner becomes a central device that controls the timing for the connection and the advertiser becomes a peripheral device. The central-peripheral role may also be called a master-slave role. There may be scenarios when a device playing the role of the central device may not have enough time to scan, but may instead want to advertise to solicit connection from a scanner. In such scenarios, it may be advantageous for the advertiser and the scanner to reverse their central-peripheral roles when creating the connection, with the advertiser becoming the central device and the scanner becoming the peripheral device in the connection state. However, there is currently no mechanism in the Bluetooth LE link layer for an advertiser to directly become a central device in a connection unless it scans.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Examples of various aspects and variations of the subject technology are described herein and illustrated in the accompanying drawings. The following description is not intended to limit the invention to these embodiments, but rather to enable a person skilled in the art to make and use this invention.

In Bluetooth LE (BLE), a device may discover and initiate a connection with a peer device using advertising channels in the frequency band (e.g., 2.4 GHz ISM). The pair of devices may enter a connection state in the link layer from an initializing state or an advertising state. In the advertising state, a device may transmit advertising packets on the advertising channels to advertise services and characteristics that may be used for communication with the device and to respond to responses triggered by the advertising packets. A device in the initializing state may listen for advertising packets from peer devices by scanning the advertising channels. The scanning device (also referred to as a scanner) may respond to an advertising packet from a peer device (also referred to as an advertiser) to initiate a connection with the advertiser when there is a rendezvous between a scanning duration and the advertising packet. In the connection state, the scanner that initiates the connection event from the initializing state may become the central device; the advertiser that responds to the connection event from the advertising state may become the peripheral device. The central device then plays the role of the master to control the timing and channels of communication with the connected peripheral device.

To increase the chance of successfully rendezvousing with an advertiser, the scanner may increase the scanning duration. However, there are scenarios where a device that wants to be a central device may have limited time to scan or may experience degraded performance in establishing connections due to many advertising peripherals crowding the advertising channels. It may be advantageous for the device to advertise to solicit connection from a scanner and yet be the central device when a connection is established with a peer device. Disclosed are techniques for a device that wants to be a central device to advertise information associated with a scan window of the device to solicit a directed advertisement event from a peer device during the advertised scan window. The peer device initially scans but may advertise during the scan window as advertised to enable the central device to create a connection in which the peer device becomes a peripheral device. Disclosed are also various aspects of techniques for a device that wants to be a central device to advertise information associated with a connection window to solicit a connection with a scanning peer device. When the scanning peer device receives the information, it may enter a connection as a peripheral device with the advertising device as the master device at the advertised connection window.

Figure 1:
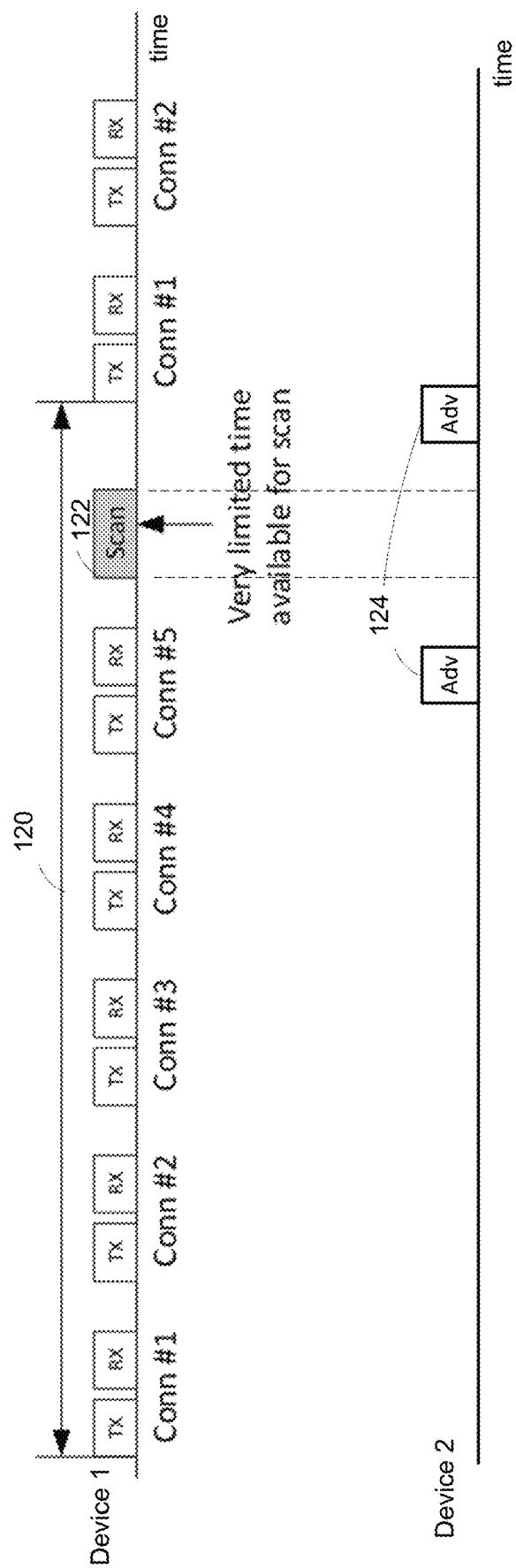
FIG. 1 depicts a scenario in which a device playing the role of a central device in a Bluetooth LE connection has limited time available to scan for advertisers, but may instead advertise to solicit connection from a peer device or to improve the chance of creating a connection between the two devices in accordance with one aspect of the present disclosure.

FIG. 1 depicts a scenario in which a device playing the role of a central device in a Bluetooth LE connection has limited time available to scan for advertisers, but may instead advertise to solicit connection from a peer device or to improve the chance of creating a connection between the two devices in accordance with one aspect of the present disclosure. Device 1 may be a BLE central device connected with 5 peripheral devices. For example, device 1 may be a game console with 5 BLE connections to remote controllers (conn #1 to conn #5). Device 1 may exchange data with the 5 peripheral devices in a time-multiplexed manner every cycle 120. In one example, the period of the cycle 120 may be 7.5 ms. If device 1 were to use the limited time remaining within the cycle 120 (e.g., 450 us every 7.5 ms) to perform a scan 122 for advertising packets 124 from device 2 (e.g., a sixth remote controller) that wants to connect, device 1 may not successfully rendezvous with device 2 on the first attempt. It may take multiple cycles 120 for the two devices to connect.

One solution may be to have device 2 advertise using high duty-cycle connectable directed advertising events to reduce the intervals between the advertising packets (e.g., ≤3.75 ms between the advertising packets on the same advertising channel). But directed advertising may not be feasible unless the devices are already paired, or otherwise previously known. High duty-cycle directed advertising may also add further congestion to the already clogged advertising channels, resulting in higher power consumption while still taking multiple scanning attempts to succeed. To reduce the slow connection time, device 1 may instead advertise to solicit connection from device 2 and yet still maintain the role as the central device with existing and newly connected devices. For example, the game console may advertise to scanning controllers to create connections. The game console remains the central device to all connected scanning controllers to avoid having multiple central devices with their own independent clock drift and disruptions to the performance of existing connections.

In another scenario, the central device may want to advertise to scanning peripheral devices to avoid many peripheral devices advertising and crowding the advertising channels. For example, a smartwatch may want to connect to one or more BLE generic attribute (GATT) proxies in a mesh network to establish links through other radio access technologies (e.g., WiFi, 5G). To limit the number of advertisement packets from degrading the performance of the mesh network, it may be advantageous for the smartwatch to advertise to solicit a connection from one of the GATT proxies rather than have all the GATT proxies advertise and crowd the advertising channels. Yet, the advertising smartwatch wants to become the central device in the connection. Thus, it is advantageous to have a mechanism for an advertising device to quickly switch to being the central device when creating a connection with a peer device.

Figure 2:
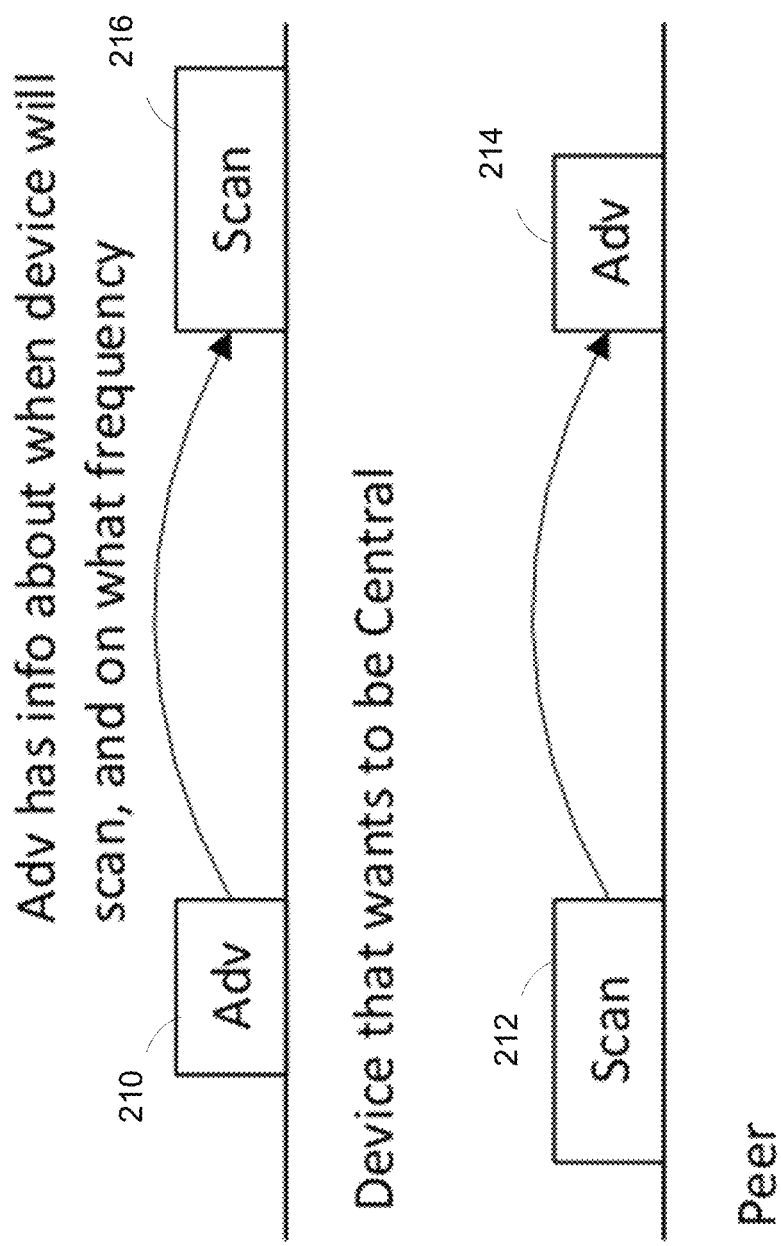
FIG. 2 illustrates a mechanism for a device that wants to be a central device to use legacy Bluetooth LE advertisement events to advertise information associated with a scan window of the device in order to solicit a directed advertisement event from a peer device during the advertised scan window to create a connection with the peer device in accordance with one aspect of the present disclosure.

FIG. 2 illustrates a mechanism for a device that wants to be a central device to use legacy Bluetooth LE advertisement events to advertise information associated a scan window of the device in order to solicit a directed advertisement event from a peer device during the advertised scan window to create a connection with the peer device in accordance with one aspect of the present disclosure. The device that wants to create the connection as the central device may be able to scan for only a short duration, resulting in a low probability of detecting advertising packets. The device may advertise information associated with the scan window to solicit a peer device to advertise during the scan window to improve the chances of successfully rendezvousing with the peer device.

In one embodiment, a first device that wants to be the central device may enter the advertising state to transmit an advertising packets 210 to advertise the scheduled scan window 216 when the first device will scan and one or more advertising channels on which the first device will scan. In one embodiment, the advertising packets may advertise the type, characteristics, offered services, etc., of the peer device the first device is looking to connect. The first device may encapsulate the information associated with the scan window 216 in a new advertising data type and may transmit the advertising packet 210 on one or more primary advertising channels (e.g., channels 37, 38, 39) using BLE legacy advertising events such as the connectable and scannable undirected event, non-connectable and non-scannable undirected event, or scannable undirected event. In one embodiment, the new advertising data type may be called LE_SCANNING_INFO and may be embedded in the 31-byte data field of the payload of the advertising packet 210.

A peer device may enter the scanning state to listen for advertising packets during a scan window 212. When the peer device detects the advertising packets 210 containing the information associated with the scan window 216 of the first device, the peer device may switch to the advertising state 214 to advertise its service to the first device during part of the scan window 216 on the advertising channels as advertised by the first device. In one embodiment, the peer device may determine if it provides the service desired by the first device as indicated in the advertising packet 210 before the peer device switches to the advertising state 214. In one embodiment, the peer device may advertise using the BLE connectable directed event (e.g., using ADV_DIRECT_IND packet).

The first device may switch to the initializing state to scan for advertisements from peer devices during the scan window 216 on the advertising channels as indicated by the advertising packet 210. When the first device detects the advertisements from the peer device, the first device may respond with a connection indication specifying a connection window and may transmit a packet during the connection window to connect with the peer device. The first device and the peer device may create the connection with the first device as the central device and the peer device as the peripheral device. Advantageously, by soliciting a directed advertising event from the peer device during the scan window 216, the first device may quickly connect with the peer device while playing the role of the central device. The protocol is BLE compliant, although the interaction uses a new advertising data type and involves reciprocally switching the first device and the peer device between advertising and scanning.

Figure 3:
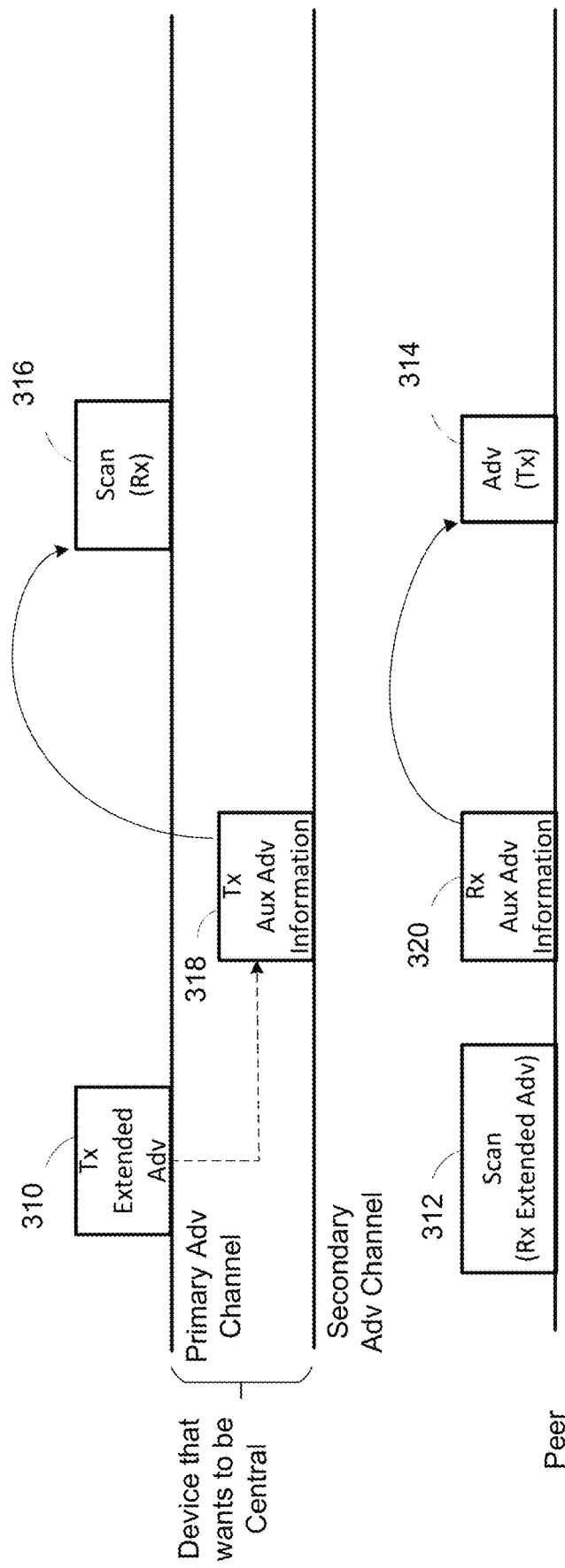
FIG. 3 illustrates a mechanism for a device that wants to be a central device to use extended Bluetooth LE advertisement events to advertise information associated with a scan window of the device in order to solicit a directed advertisement from a peer device during the advertised scan window to create a connection with the peer device in accordance with one aspect of the present disclosure.

FIG. 3 illustrates a mechanism for a device that wants to be a central device to use extended Bluetooth LE advertisement events to advertise information associated with a scan window of the device in order to solicit a directed advertisement from a peer device during the advertised scan window to create a connection with the peer device in accordance with one aspect of the present disclosure. Similar to FIG. 2, the device may advertise information associated with the scan window of the device to solicit a peer device to advertise during the scan window to improve the chances of successfully rendezvousing with the peer device.

A first device that wants to be the central device may be in an advertising state to transmit the information associated with the scan window 316 in an extended advertising packet 310 carried on a primary advertising channel or an auxiliary advertising packet 318 carried on a secondary advertising channel pointed to by the extended advertising packet 310. In one embodiment, the extended advertising packet 310 may be the ADV_EXT_IND packet and the auxiliary advertising packet 318 may be the AUX_AD_IND packet transmitted using BLE extended advertising events such as the scannable undirected or directed event, or non-connectable and non-scannable undirected or directed event. The information associated with the scan window 316 may be embedded in the payload or the extended header of the ADV_EXT_IND and/or the AUX_ADV_IND packets.

A peer device may be in a scanning state to scan for advertising packets during a scan window 312 to receive the extended advertising packet 310. The peer device may receive the auxiliary advertising packet 318 in a receive window 320 indicated by the extended advertising packet 310. With the received information associated with the scan window 316 of the first device, the peer device may switch to the advertising state 314 to advertise its service to the first device using the connectable directed event. The first device may switch to the initializing state to scan for advertisements from peer devices during the scan window 316. When the first device detects the advertisements from the peer device, the first device may respond with a packet at a connection event to connect with the peer device with the first device as the central device and the peer device as the peripheral device.

Figure 4:
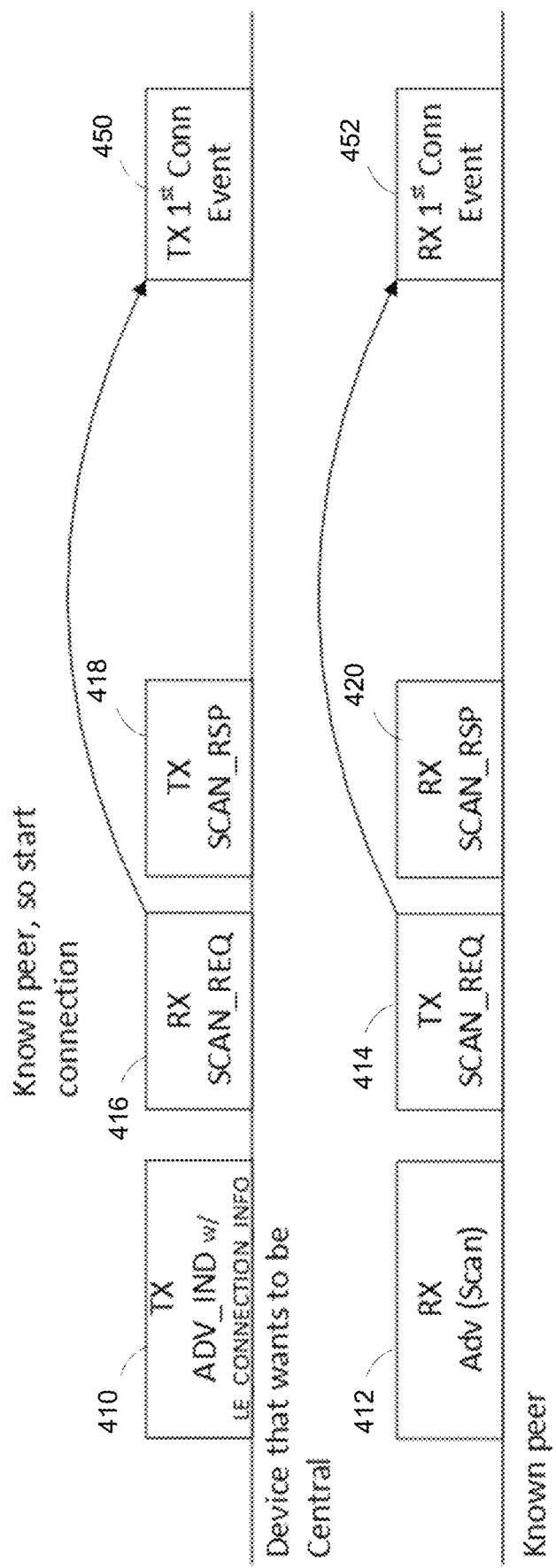
FIG. 4 illustrates a mechanism for a device that wants to be a central device to use advertising packets of a Bluetooth LE legacy undirected advertising event to advertise information associated with a connection event in order to solicit a scanning peer device to connect during the advertised connection event in accordance with one aspect of the present disclosure.

FIG. 4 illustrates a mechanism for a device that wants to be a central device to use advertising packets of a Bluetooth LE legacy undirected advertising event to advertise information associated with a connection event in order to solicit a scanning peer device to connect during the advertised connection event in accordance with one aspect of the present disclosure. In contrast to FIG. 2 and FIG. 3 where the device that wants to be the central device advertises information associated with its scan time to solicit advertisements from an advertising peer device, the device in FIG. 4 advertises information associated with a time window when the device will transmit a connection event to connect with a scanning peer device.

In one embodiment, a first device that wants to be the central device may enter the advertising state to transmit an advertising packet 410 to advertise the scheduled connection window 450 when the first device will transmit a connection event. In one embodiment, the advertising packet may contain connection information similar to that in a BLE connection indication (CONNECT_IND) packet, such as the window size (WinSize) and window offset (WinOffset), channel mapping (ChM), etc., of the connection event window transmitted by a central device in the initiating state. A host may program the first device with the connection information via a vendor specific command (VSC) (e.g., Create_Central_Conn_As_Advertiser). The first device may encapsulate the connection information in a new advertising data type and may transmit the advertising packet 410 on one or more primary advertising channels using BLE legacy advertising events such as the connectable and scannable undirected advertising event. In one embodiment, the new advertising data type may be called LE_CONNECTION_INFO and may be embedded in the 31-byte data field of the payload of the advertising indication (e.g., ADV_IND) packet.

A peer device may enter the scanning state to listen for advertising packets during a scan window 412 using active scanning. When the peer device detects the advertising packet 410 containing the connection information, the peer device has the option to connect as a peripheral device with the first device at the scheduled connection window 450. In one embodiment, the peer device may be known to the first device (e.g., the two devices have been paired). Because the peer device determines the timing of the connection event window with respect to when it receives the advertising packet 410 containing the connection information, the host of the first device may program the connection window 450 so that the connection window 450 will overlap with the connection event window irrespective of the primary advertising channel on which the advertising packet 410 is detected by the peer device. For example, the window size (WinSize) may be set long enough so that the connection window 450 may encompass the connection event window determined by the peer device using the window offset (WinOffset) from any of the advertising packets 410 repeated on the three primary advertising channels.

When the peer device detects the advertising packet 410 containing the connection information on one of the primary advertising channels, the peer device may transmit a scan request packet (e.g., SCAN_REQ) at time 414 to the first device to request additional information. When the first device receives the scan request packet at time 416 from the known peer device, the first device may start a connection as the central device. The first device may first reply with a scan response packet (e.g., SCAN_RSP) to the peer device on the same primary advertising channel at time 418. The first device may then exit the advertising state and switch to the connection state to transmit a packet at a connection event as the central device at the advertised connection window 450.

When the peer device receives the scan response packet at time 420, the peer device may exit the scanning state and switch to the connection state as a peripheral device to listen for the connection event during the connection event window 452 as determined from the advertised connection information. After the central device and the peripheral device exchange connection packets, the connection is considered as established. The two devices may send an LE connection complete indication to their respective hosts. In one embodiment, the second device transmits the scan request packet to obtain additional information about the first device, but whether the second device is interested in entering a connection as a peripheral device with the first device is ambiguous, a scenario referred to as the overloading of the scan request packet. The first device may transmit the connection event to enter the connection. If the second device is not interested in or is incapable of entering the connection, the second device may not respond to the connection event and the nascent connection may gracefully fail through a time-out mechanism without any harm.

Advantageously, the first device as the advertiser may create a connection to the scanning peer device, with the advertiser becoming the central device and the scanning peer device becoming the peer device when entering the connection. The protocol is BLE compliant, although the ADV_IND packet may contain a new advertising data type to indicate the connection information. In one embodiment, to avoid overloading, the second device may make its intention known by using a bit in the scan request packet to indicate that it is interested in or capable of creating a connection as the peripheral device with the first device, at a cost of making the scan request non-BLE-specs compliant. One drawback of embedding the connection information in the payload of the advertising indication (ADV_IND) packet is that the ADV_IND packet may not have enough space left in the payload to carry other information. The protocol may also be slow to establish a connection if there are multiple active scanners.

Figure 5:
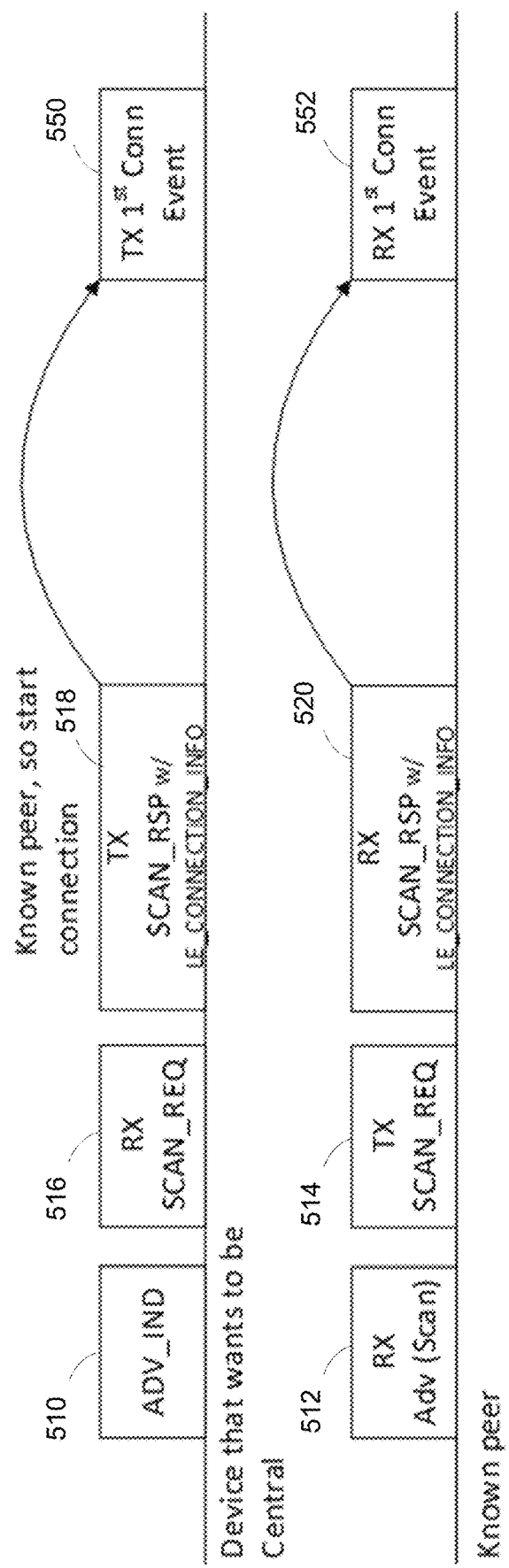
FIG. 5 illustrates a mechanism for a device that wants to be a central device to use scan response packets of a Bluetooth LE legacy undirected advertising event to advertise information associated with a connection event in order to solicit a scanning peer device to connect during the connection event in accordance with one aspect of the present disclosure.

FIG. 5 illustrates a mechanism for a device that wants to be a central device to use scan response packets of a Bluetooth LE legacy undirected advertising event to advertise information associated with a connection event in order to solicit a scanning peer device to connect during the connection event in accordance with one aspect of the present disclosure. The principle of advertising the connection information to allow a scanning peer device to jump into the BLE connection as a peripheral device is the same as that of FIG. 4. However, instead of embedding the connection information in the ADV_IND packet, the first device may embed the connection information in the SCAN_RSP packet.

The first device that wants to be the central device may transmit an ADV_IND packet 510 that does not contain the connection information. A peer device that has been paired with the first device may scan to listen for advertising packets during a scan window 512. When the peer device detects the ADV_IND packet, the peer device may transmit a SCAN_REQ packet to the first device at time 514 to request additional information. When the first device receives the SCAN_REQ packet at time 516 from the known peer device, the first device may transmit a SCAN_RSP packet at time 518 that encapsulates information on the scheduled connection window 550 when the first device will transmit a connection event. The connection information may be similar to that in a CONNECT_IND packet. The timing of the connection event window may be specified using the window offset (WinOffset) parameter with respect to the end of the SCAN_RSP packet. Because the window offset parameter is specified with respect to only one packet, it avoids the large window size (WinSize) used when embedding the connection information in the ADV_IND packet transmitted on the three primary advertising channels of FIG. 4.

At time 520, when the peer device receives the SCAN_RSP packet containing the information on the scheduled connection window 550, the peer device may determine the connection event window 552. The first device may enter the connection state as the central device to establish the connection with the peer device as the peripheral device as discussed. As in FIG. 4, if the second device transmits the SCAN_REQ packet without intending to enter into the connection with the first device, the second device may not respond to the connection event and the nascent connection may gracefully fail through a time-out mechanism.

Advantageously, the protocol is BLE compliant, although the SCAN_RSP packet may contain a new advertising data type to indicate the connection information. In one embodiment, the second device may use a bit in the SCAN_REQ packet to indicate that it is interested in or capable of creating a connection as the peripheral device with the first device, at a cost of making the scan request non-BLE-specs compliant. One drawback of embedding the connection information in the payload of the SCAN_RSP packet is that the SCAN_RSP packet may not have enough space left in the payload to carry other information. The protocol may also be slow to establish a connection if there are multiple active scanners.

Figure 6:
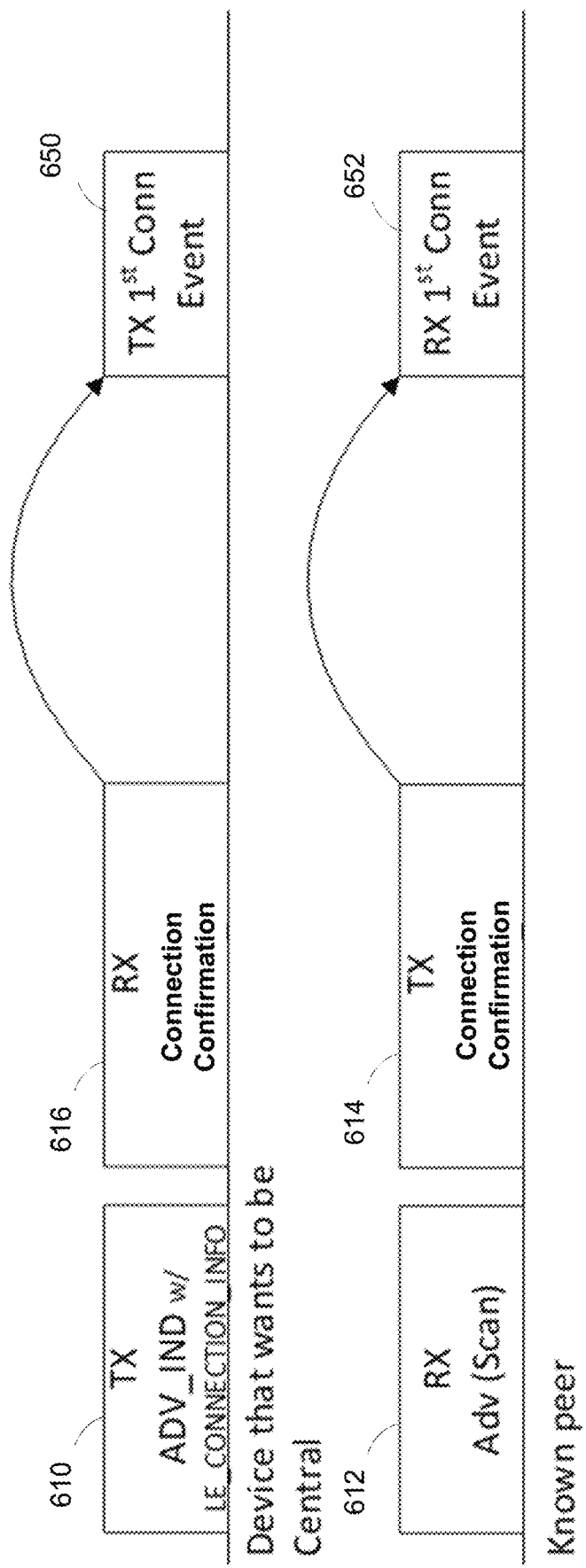
FIG. 6 illustrates a mechanism for a device that wants to be a central device to use advertising packets of a Bluetooth LE legacy undirected advertising event to advertise information associated with a connection event in order to solicit a scanning peer device to connect during the advertised connection event using a protocol in which the peer device acknowledges the advertised connection event and becomes the peripheral device in accordance with one aspect of the present disclosure.

FIG. 6 illustrates a mechanism for a device that wants to be a central device to use advertising packets of a Bluetooth LE legacy undirected advertising event to advertise information associated with a connection event in order to solicit a scanning peer device to connect during the advertised connection event using a protocol in which the peer device acknowledges the advertised connection event and becomes the peripheral device in accordance with one aspect of the present disclosure. As in FIG. 4, the connection information may be embedded in the ADV_IND packet. However, instead responding with the SCAN_REQ packet, the peer device may respond with a new protocol message to enter into a connection as the peripheral device.

A first device that wants to be the central device may transmit an advertising packet 610 such as the ADV_IND packet containing the connection information to advertise the scheduled connection window 650 when the first device will transmit a connection event. A peer device that may or may not have been paired with the first device may scan to listen for advertising packets during a scan window 612. When the peer device detects the ADV_IND packet, the peer device may transmit a connection confirmation message 614 to the first device to confirm that the peer device is interested in entering into a connection as a peripheral device with the first device. In one embodiment, the connection confirmation message 614 may be called the PERIPHERAL_CONNECT_IND packet. When the first device receives the connection confirmation message 614 at time 616 from the known peer device, the first device may transmit the connection event as the central device at the advertised connection window 650.

The peer device may listen for the connection event during the connection event window 652 as determined from the advertised connection information to establish the connection with the first device. The connection confirmation message 614 unambiguously communicates the peer device's intention to create a connection as a peripheral device with the first device. It avoids overloading the SCAN_REQ packet and reduces the possibility of creating unintended connections. It also accelerates the establishment of the connection by eliminating the exchange of the SCAN_REQ and SCAN_RSP packets normally associated with the ADV_IND packet. In one embodiment, the two devices may establish a connection in less than 800 uS, allowing a game console to quickly connect with a new remote controller in the application of FIG. 1. However, the connection confirmation message 614 is not BLE compliant and the advertised connection information is still embedded in the ADV_IND packet, reducing its available payload to carry other information.

Figure 7:
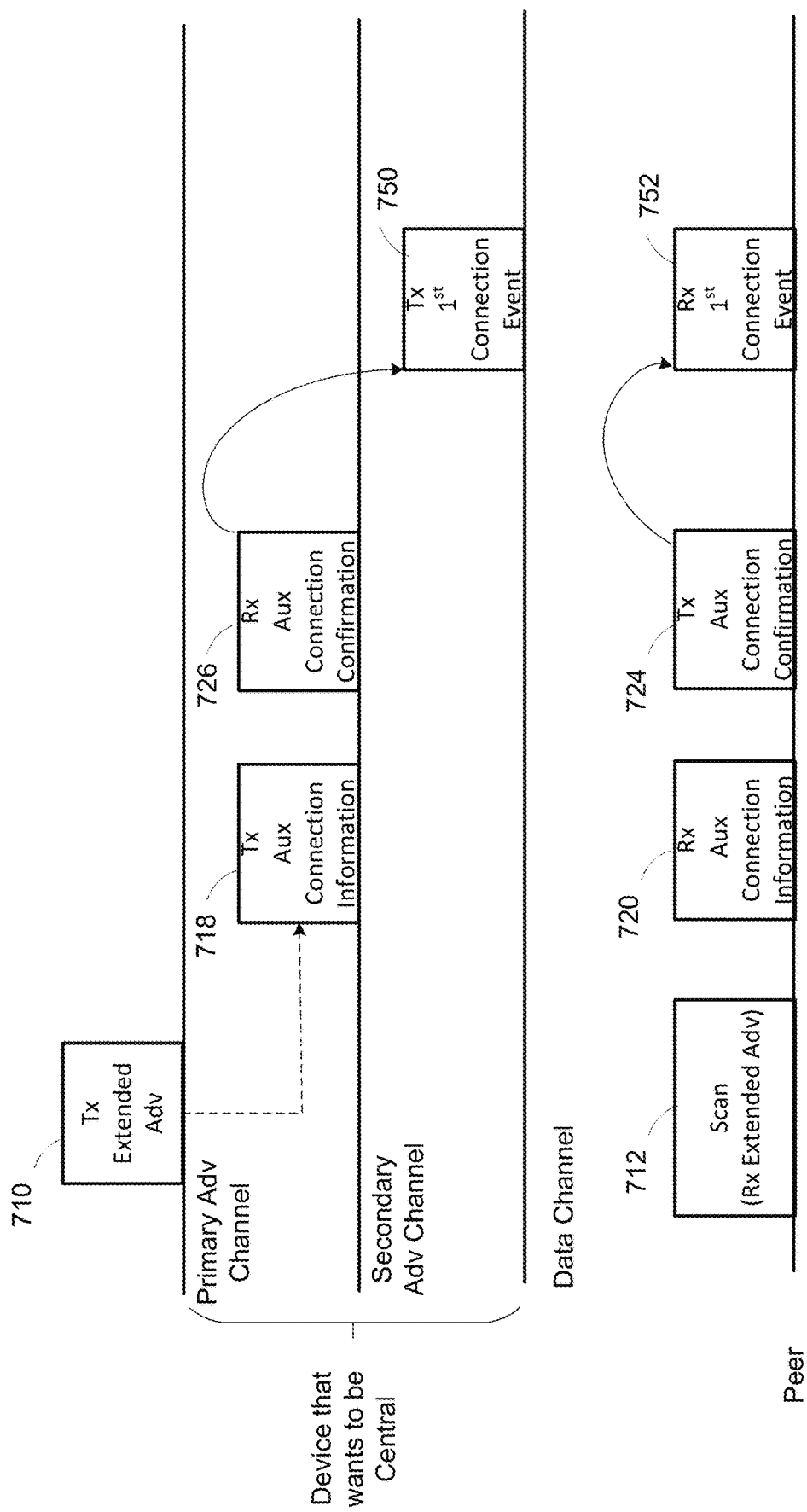
FIG. 7 illustrates a mechanism for a device that wants to be a central device to use auxiliary packets of a Bluetooth LE extended advertising event to advertise information associated with a connection event in order to solicit a scanning peer device to connect during the advertised connection event using a protocol in which the peer device acknowledges the advertised connection event and becomes the peripheral device in accordance with one aspect of the present disclosure.

FIG. 7 illustrates a mechanism for a device that wants to be a central device to use auxiliary packets of a Bluetooth LE extended advertising event to advertise information associated with a connection event in order to solicit a scanning peer device to connect during the advertised connection event using a protocol in which the peer device acknowledges the advertised connection event and becomes the peripheral device in accordance with one aspect of the present disclosure.

A first device that wants to be the central device may transmit the information associated with the scheduled connection window 750 in an extended advertising packet 710 carried on a primary advertising channel or an auxiliary advertising packet 718 carried on a secondary advertising channel pointed to by the extended advertising packet 710. In one embodiment, the extended advertising packet 710 may be the ADV_EXT_IND packet and the auxiliary advertising packet 718 may be the AUX_ADV_IND packet transmitted using BLE extended advertising events such as the connectable undirected event or the connectable directed event. The information associated with the connection window 750 may be embedded in the payload or the extended header of the ADV_EXT_IND and/or the AUX_ADV_IND packets.

A peer device that may or may not have been paired with the first device may scan during a scan window 712 to receive the extended advertising packet 710. The peer device may receive the auxiliary advertising packet 718 in a receive window 720 indicated by the extended advertising packet 710. When the peer device receives the information associated with the connection window 750, the peer device may transmit an auxiliary connection confirmation message 724 to the first device to confirm that the peer device is interested in entering into a connection as a peripheral device with the first device. In one embodiment, the auxiliary connection confirmation message 724 may be called the AUX_PERIPHERAL_CONNECT_IND packet.

When the first device receives the auxiliary connection confirmation message 724 at time 726 from the known peer device, the first device may transmit the connection event as the central device at the advertised connection window 750. The peer device may listen for the connection event during the connection event window 752 as determined from the advertised connection information to establish the connection with the first device. As in FIG. 6, the auxiliary connection confirmation message 724 unambiguously communicates the peer device's intention to create a connection as a peripheral device with the first device to reduce the possibility of creating unintended connections, but at a cost of making the protocol non BLE-compliant. Using the extended advertising event to transmit the connection information alleviates the pressure on the payload of the advertising packet of the primary advertising channel, allowing the advertising event to carry other information.

Figure 8:
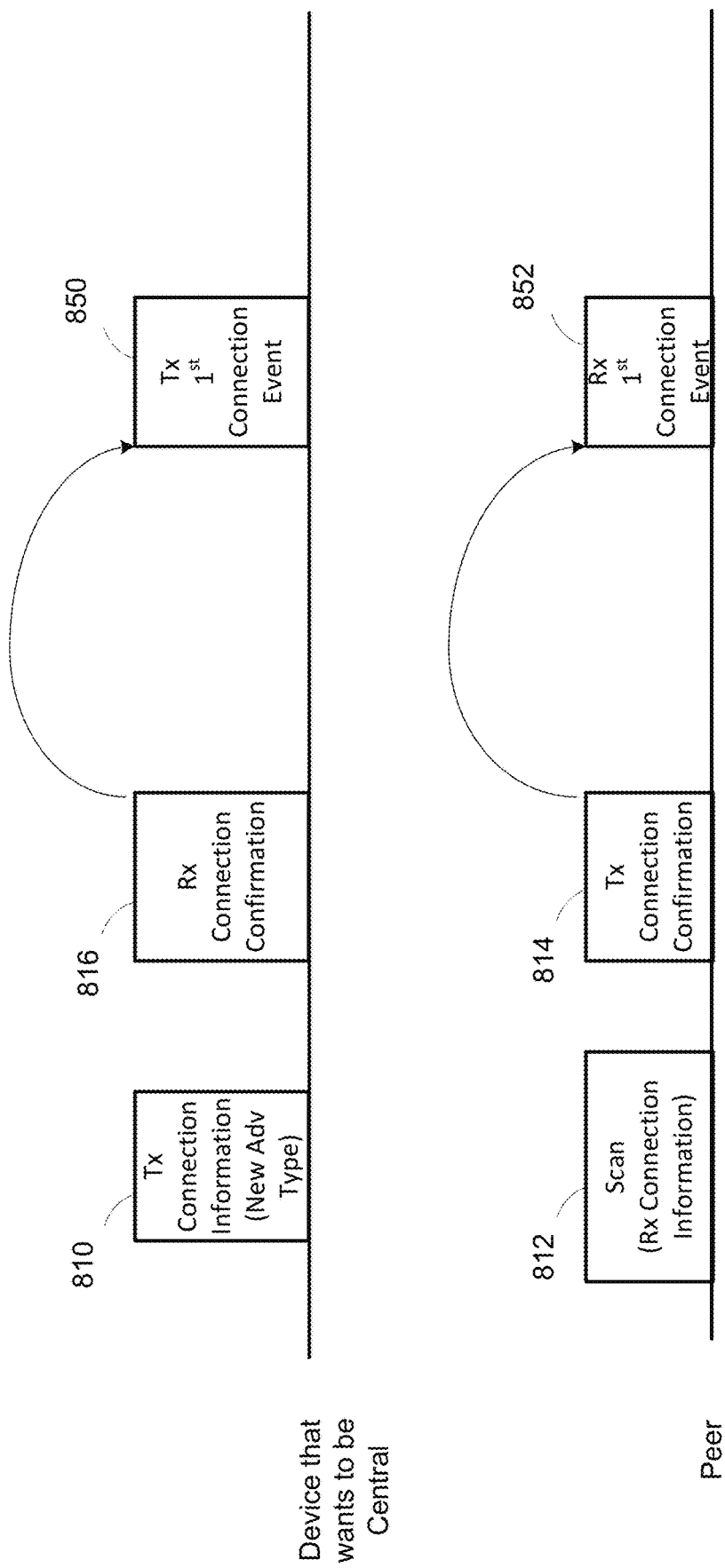
FIG. 8 illustrates a mechanism for a device that wants to be a central device to use advertising packets of a new connectable advertising event to advertise information associated with a connection event in order to solicit a scanning peer device to connect during the advertised connection event using a protocol in which the peer device acknowledges the advertised connection event and becomes the peripheral device in accordance with one aspect of the present disclosure.

FIG. 8 illustrates a mechanism for a device that wants to be a central device to use advertising packets of a new connectable advertising event to advertise information associated with a connection event in order to solicit a scanning peer device to connect during the advertised connection event using a protocol in which the peer device acknowledges the advertised connection event and becomes the peripheral device in accordance with one aspect of the present disclosure. The peer device may respond with a connection confirmation message as in FIG. 6.

A first device that wants to be the central device may advertise connection information of the scheduled connection window 850 on a new connectable advertising packet 810. In one embodiment, the connectable advertising packet 810 may be called the ADV_CENTRAL_CONNECT_IND packet to clearly indicate the intention of the advertiser to be the central device in a new connection with a peer device. A peer device that may or may not have been paired with the first device may scan to listen for advertising packets during a scan window 812. When the peer device detects the new connectable advertising packet, the peer device may transmit a connection confirmation message 814 to the first device to confirm that the peer device is interested in entering into a connection as a peripheral device with the first device. In one embodiment, the connection confirmation message 814 may be called the PERIPHERAL_CONNECT_CNF packet.

When the first device receives the connection confirmation message 814 at time 816 from the known peer device, the first device may transmit the connection event as the central device at the advertised connection window 850. The peer device may listen for the connection event during the connection event window 852 as determined from the advertised connection information to establish the connection with the first device. Using the new connectable advertising packet to transmit the connection information allows the first device to use the entire payload of the ADV_IND packet to carry other advertising information. It also accelerates the establishment of the connection by eliminating the peer device's processing of the ADV_IND packet to retrieve the connection information embedded in the payload from other advertising information. However, the protocol is not BLE compliant.

Figure 9:
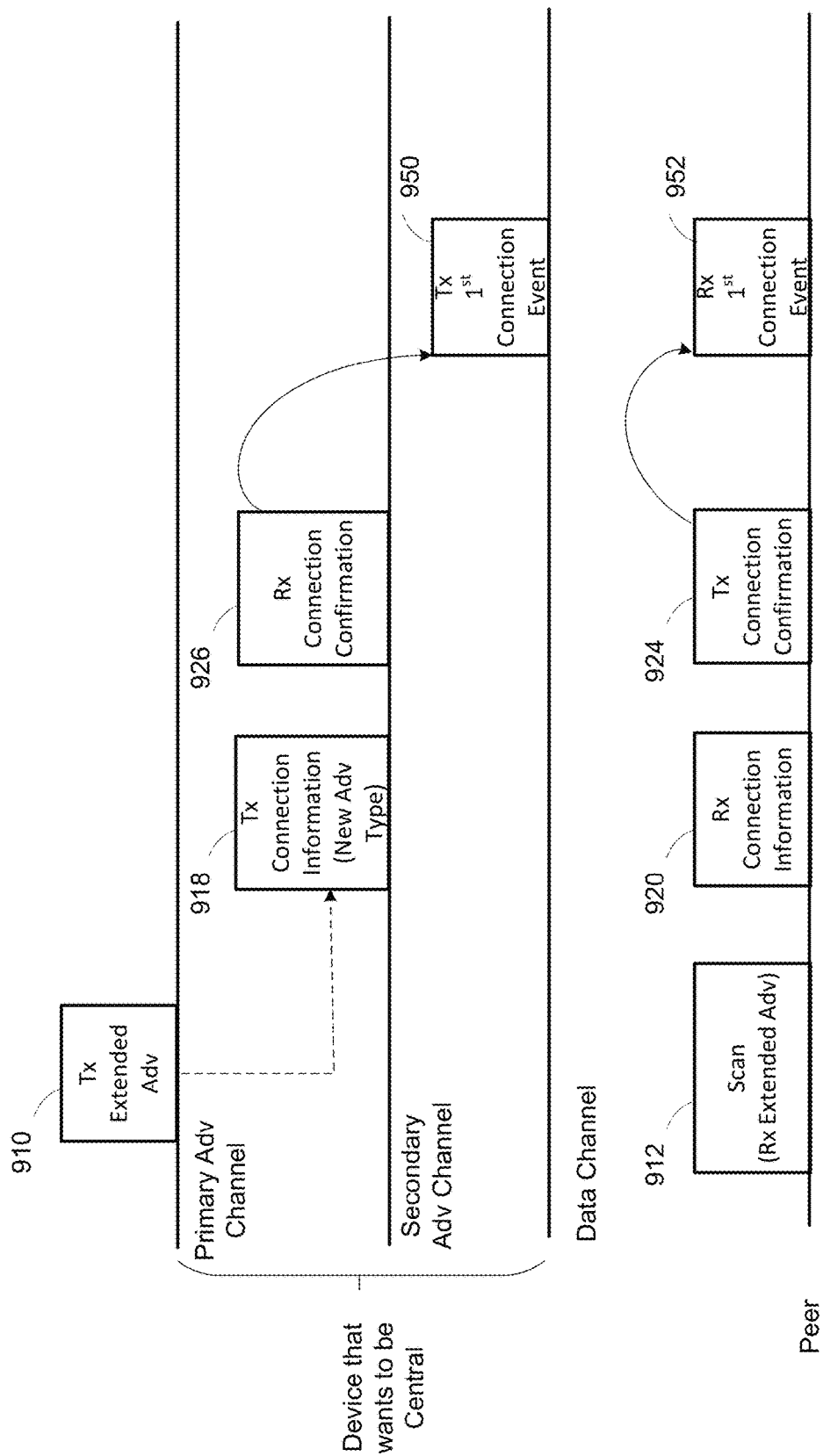
FIG. 9 illustrates a mechanism for a device that wants to be a central device to use extended advertising event containing a new connectable advertising packet to advertise information associated with a connection event in order to solicit a scanning peer device to connect during the advertised connection event using a protocol in which the peer device acknowledges the advertised connection event and becomes the peripheral device in accordance with one aspect of the present disclosure.

FIG. 9 illustrates a mechanism for a device that wants to be a central device to use extended advertising event containing a new connectable advertising packet to advertise information associated with a connection event in order to solicit a scanning peer device to connect during the advertised connection event using a protocol in which the peer device acknowledges the advertised connection event and becomes the peripheral device in accordance with one aspect of the present disclosure.

A first device that wants to be the central device may transmit the information associated with the scheduled connection window 950 on a new auxiliary connectable advertising packet 918 carried on a secondary advertising channel pointed to by an extended advertising packet 910 carried on a primary advertising channel. In one embodiment, the extended advertising packet 910 may be the ADV_EXT_IND packet of the BLE extended advertising event. The new auxiliary connectable advertising packet 918 may be called the AUX_CENTRAL_CONNECT_IND packet to clearly indicate the intention of the advertiser to be the central device in a new connection with a peer device.

A peer device that may or may not have been paired with the first device may scan to listen for advertising packets during a scan window 912 to receive the extended advertising packet 910. The peer device may receive the new auxiliary connectable advertising packet 918 in a receive window 920 indicated by the extended advertising packet 910. When the peer device receives the information associated with the connection window 950, the peer device may transmit an auxiliary connection confirmation message 924 to the first device to confirm that the peer device is interested in entering into a connection as a peripheral device with the first device as in FIG. 7. In one embodiment, the auxiliary connection confirmation message 924 may be called the AUX_PERIPHERAL_CONNECT_IND packet.

When the first device receives the auxiliary connection confirmation message 924 at time 926 from the known peer device, the first device may transmit the connection event as the central device at the advertised connection window 950. The peer device may listen for the connection event during the connection event window 952 as determined from the advertised connection information to establish the connection with the first device. Using the new auxiliary connectable advertising packet 918 in the extended advertising event to transmit the connection information alleviates the pressure on the payload of the advertising packet of the primary advertising channel and accelerates the establishment of the connection. The auxiliary connection confirmation message 924 also unambiguously communicates the peer device's intention to create a connection as a peripheral device with the first device to reduce the possibility of creating unintended connections. However, the protocol is not BLE compliant.

Figure 10:
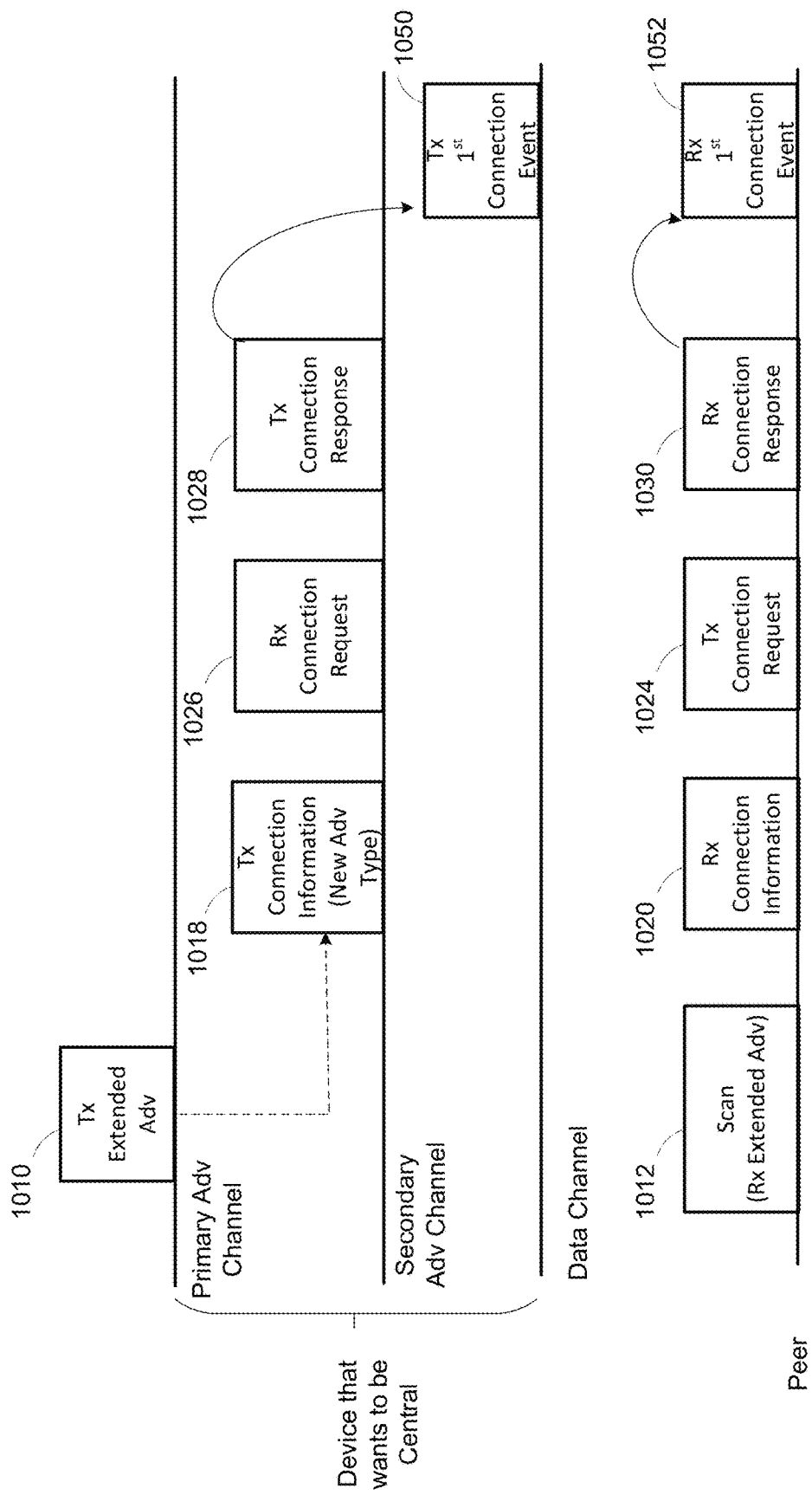
FIG. 10 illustrates a mechanism for a device that wants to be a central device to use extended advertising event containing a new connectable advertising packet to advertise information associated with a connection event in order to solicit a scanning peer device to connect during the advertised connection event using the request-and-response exchange protocol of the BLE extended advertising event in which the peer device acknowledges the advertised connection event and to becomes the peripheral device in accordance with one aspect of the present disclosure.

FIG. 10 illustrates a mechanism for a device that wants to be a central device to use extended advertising event containing a new connectable advertising packet to advertise information associated with a connection event in order to solicit a scanning peer device to connect during the advertised connection event using the request-and-response exchange protocol of the BLE extended advertising event in which the peer device acknowledges the advertised connection event and to becomes the peripheral device in accordance with one aspect of the present disclosure.

The extended advertising events of 1010, 1012, 1018, and 1020 used for a first device to transmit and a peer device to receive the information associated with the scheduled connection window 1050 are similar to those of 910, 912, 918, and 920 of FIG. 9, and will not be elaborated for sake of brevity. When the peer device receives the information associated with the connection window 1050, the peer device may transmit an auxiliary connection request message 1024 to the first device to confirm that the peer device is interested in entering into a connection as a peripheral device with the first device. In one embodiment, auxiliary connection request message 1024 may be called the AUX_PERIPHERAL_CONNECT_REQ packet.

When the first device receives the auxiliary connection request message 1024 at time 1026 from the known peer device, the first device may reply with an auxiliary connection response message 1028. In one embodiment, the auxiliary connection response message 1028 may be called the AUX_PERIPHERAL_CONNECT_RSP packet. The first device may then transmit a connection event as the central device at the advertised connection window 1050. When the peer device receives the auxiliary connection response message at time 1030, the peer device may listen for the connection event during the connection event window 1052 as determined from the advertised connection information to establish the connection with the first device.

The exchange of the auxiliary connection request message 1024 and the auxiliary connection response message 1028 mimics the exchange of the AUX_CONNECT_REQ and the AUX_CONNECT_RSP packets used in BLE extended advertising events such as the connectable undirected event or the connectable directed event. As in FIG. 9, using the new auxiliary connectable advertising packet 1018 in the extended advertising event to transmit the connection information alleviates the pressure on the payload of the advertising packet of the primary advertising channel and accelerates the establishment of the connection. The auxiliary connection request message 1024 also unambiguously communicates the peer device's intention to create a connection as a peripheral device with the first device to reduce the possibility of creating unintended connections. However, the protocol is not BLE compliant.

Figure 11:
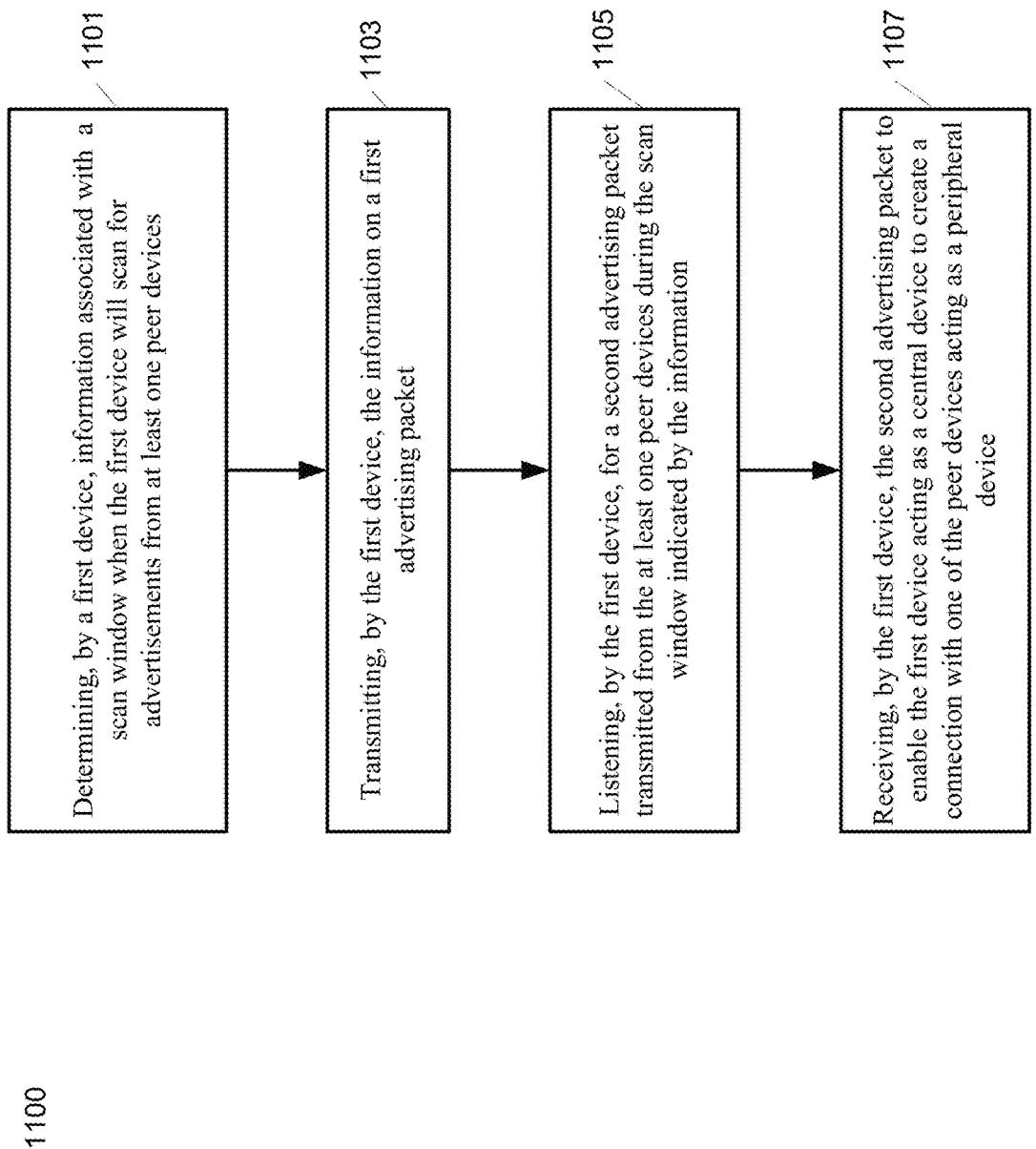
FIG. 11 illustrates a flow diagram of a method for a device that wants to be a central device to advertise information associated with a scan window of the device to solicit a directed advertisement event from a peer device during the advertised scan window for creating a connection in accordance with one aspect of the present disclosure.

FIG. 11 illustrates a flow diagram of a method 1100 for a device that wants to be a central device to advertise information associated with a scan window of the device to solicit a directed advertisement event from a peer device during the advertised scan window for creating a connection in accordance with one aspect of the present disclosure. In one aspect, the method 1100 may be performed by the host and the controller of a BLE system utilizing hardware, software, or combinations of hardware and software.

In operation 1101, a first device that wants to be a central device in a connection determines information associated with a scan window when the first device will scan for advertisements from one or more peer devices. In one aspect, the information may include a time and an advertising channel of the scan window, the type, characteristics, offered services, etc., of one or more peer devices the first device is looking to connect.

In operation 1103, the first device transmits the information on a first advertising packet. In one aspect, the first device may embed the information in a packet of a BLE advertising event transmitted on one or more advertising channels. In one aspect, the first device may transmit the information using an extended BLE advertising packet format.

In operation 1105, the first device scans to listen for a second advertising packet transmitted by one or more of the peer devices during the scan window indicated by the information. The scan window may represent a time window and an advertising channel that may be used by a peer device that receives the advertised information to advertise its service to improve the chances of the first device successfully rendezvousing with the peer device when the scan window is short. In one aspect, the second advertising packet may be part of a BLE connectable directed event (e.g., using ADV_DIRECT_IND packet).

In operation 1107, the first device receives the second advertising packet to enable the first device to play the role of the central device to create a connection with one of the peer devices acting as a peripheral device. In one aspect, the first device may respond with a BLE connection indication (CONNECT_IND) packet specifying a connection window and may transmit a BLE packet during the connection window to connect with the peer device.

Figure 12:
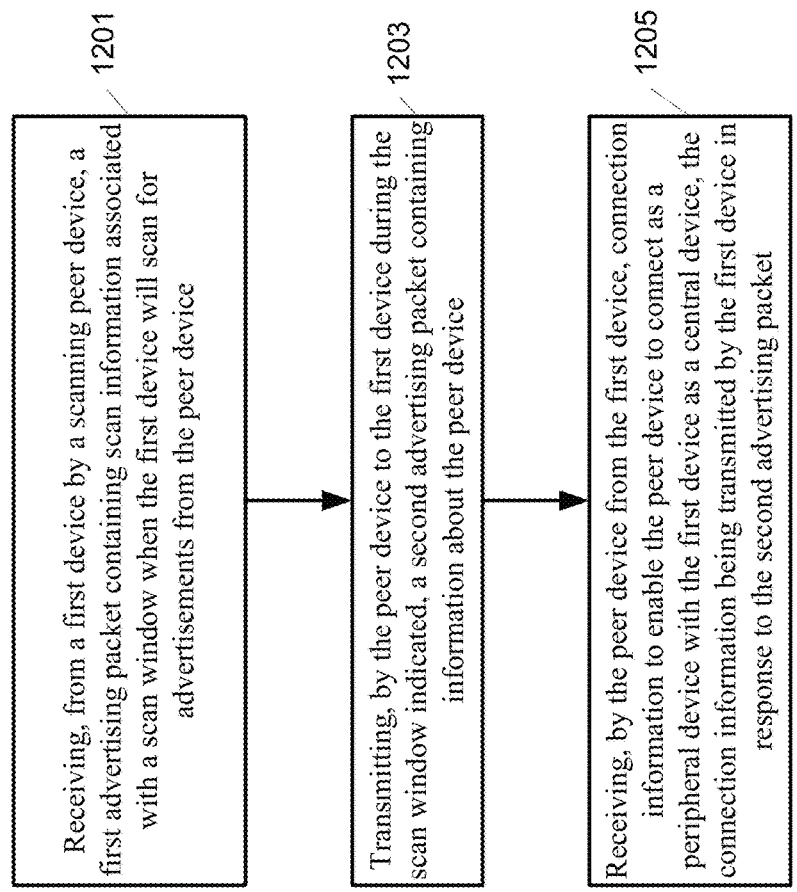
FIG. 12 illustrates a flow diagram of a method for a peer device to receive from an advertising device information associated with a scan window of the advertising device used to solicit a directed advertisement event from the peer device for creating a connection in which the advertising device is a central device and the peer device is a peripheral device in accordance with one aspect of the present disclosure.

FIG. 12 illustrates a flow diagram of a method 1200 for a peer device to receive from an advertising device information associated with a scan window of the advertising device used to solicit a directed advertisement event from the peer device for creating a connection in which the advertising device is a central device and the peer device is a peripheral device in accordance with one aspect of the present disclosure. In one aspect, the method 1200 may be performed by the host and the controller of a BLE system utilizing hardware, software, or combinations of hardware and software.

In operation 1201, the peer device scans for advertisements and receives from a first device a first advertising packet containing scan information associated with a scan window when the first device will scan for advertisements from the peer device. In one aspect, the scan information may include the time and an advertising channel of the scan window, the type, characteristics, offered services, etc., of one or more peer devices the first device is looking to connect. In one aspect, the first advertising packet may be part of a BLE advertising event transmitted on one or more advertising channels. In one aspect, the first advertising packet may be transmitted using an extended BLE advertising packet format.

In operation 1203, the peer device transmits to the first device a second advertising packet containing information about the peer device during the scan window indicated by the scan information. In one aspect, the peer device may transmit the second advertising packet to the first device using a BLE connectable directed event. In one aspect, the peer device may determine if it provides the service or has the characteristics desired by the first device as indicated by the scan information before it transmits the second advertising packet.

In operation 1205, the peer device receives from the first device connection information to enable the peer device to connect as a peripheral device with the first device as a central device. The connection information is transmitted by the first device in response to receiving the second advertising packet. In one aspect, the connection information may be received on a BLE connection indication packet. The connection information may specify a connection window when the peer device as the peripheral device may receive a BLE packet from the first device to establish the connection with the first device as the central device.

Figure 13:
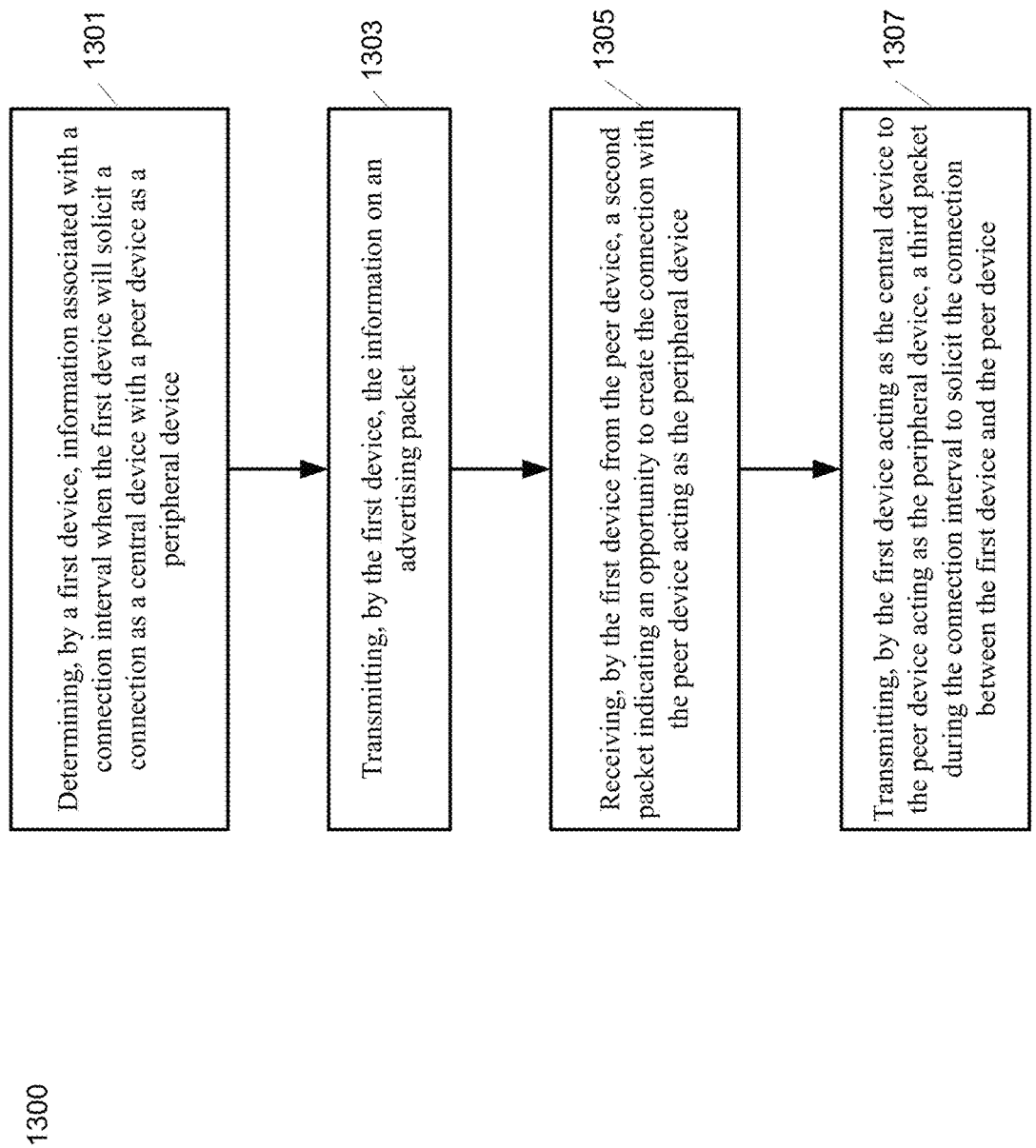
FIG. 13 illustrates a flow diagram of a method for a device that wants to be a central device to advertise information associated with a connection event to solicit a connection with a scanning peer device using the advertised connection event in which the peer device becomes the peripheral device in accordance with one aspect of the present disclosure.

FIG. 13 illustrates a flow diagram of a method 1300 for a device that wants to be a central device to advertise information associated with a connection event to solicit a connection with a scanning peer device using the advertised connection event in which the peer device becomes the peripheral device in accordance with one aspect of the present disclosure. In one aspect, the method 1300 may be performed by the host and the controller of a BLE system utilizing hardware, software, or combinations of hardware and software.

In operation 1301, a first device determines information associated with a connection window when the first device will solicit a connection as a central device with a peer device as a peripheral device. In one aspect, the information is similar to that contained in a BLE connection indication (CONNECT_IND) packet, such as the window size (WinSize) and window offset (WinOffset), channel mapping (ChM), etc., of the connection window transmitted by a central device initiating a connection with a peripheral device.

In operation 1303, the first device transmits the information on an advertising packet. In one aspect, the first device may encapsulate the information in a new advertising data type embedded in the payload of the BLE advertising indication (ADV_IND) packet of the connectable and scannable undirected advertising event transmitted on one or more advertising channels. In one aspect, the information may be embedded in the BLE scan response (SCAN_RSP) packet of the connectable and scannable undirected advertising event. In one aspect, the information may be embedded in a new connectable advertising packet. In one aspect, the first device may transmit the information using an extended BLE advertising packet format.

In operation 1305, the first device receives from the peer device a second packet indicating an opportunity to create the connection with the peer device acting as the peripheral device. In one aspect, the second packet may be received as the BLE scan request (SCAN_REQ) packet from the peer device as a known peer. In one aspect, the second packet may be a connection confirmation packet that indicates that the peer device is interested in or is capable of creating a connection as a peripheral device with the first device. In one aspect, the second packet may be received using an extended BLE advertising packet format.

In operation 1307, the first device plays the role of the central device to transmit a third packet during the connection window to solicit the connection between the first device and the peer device playing the role of the peripheral device. In one aspect, if the peer device is interested in creating the connection with the first device, the first device may receive a responding packet from the peer device to establish the connection. If the peer device is not interested in or is incapable of entering the connection, the peer device may not respond to the third packet transmitted by the first device and the nascent connection may gracefully fail through a time-out mechanism.

Figure 14:
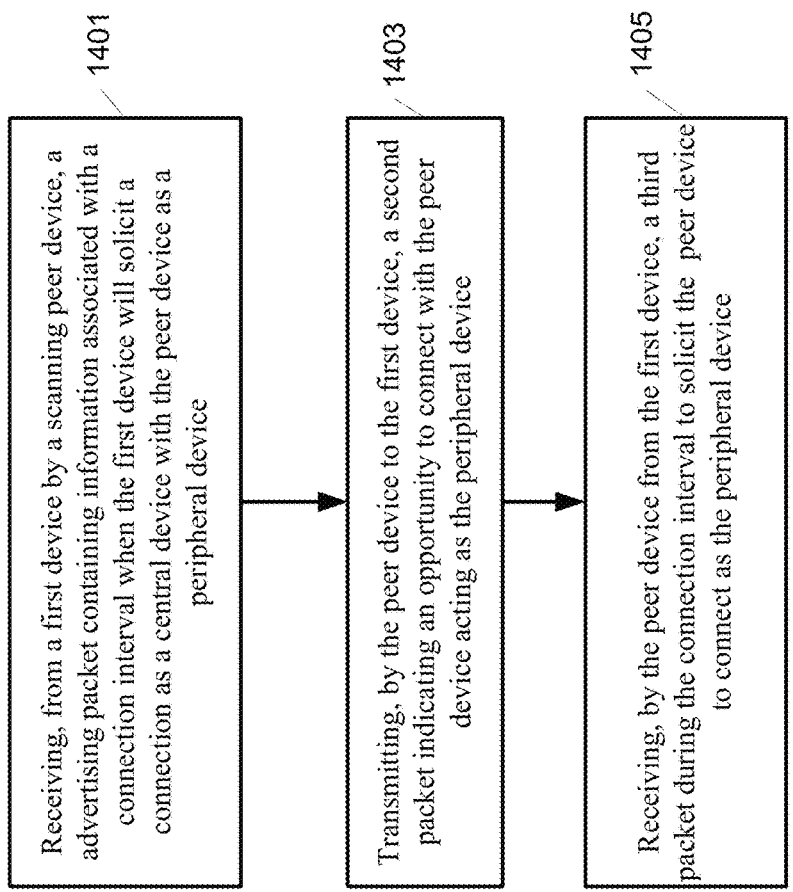
FIG. 14 illustrates a flow diagram of a method for a peer device to receive from an advertising device information associated with a connection event used to solicit a connection with the peer device in which the advertising device is a central device and the peer device is a peripheral device in accordance with one aspect of the present disclosure.

FIG. 14 illustrates a flow diagram of a method 1400 for a peer device to receive from an advertising device information associated with a connection event used to solicit a connection with the peer device in which the advertising device is a central device and the peer device is a peripheral device in accordance with one aspect of the present disclosure. In one aspect, the method 1400 may be performed by the host and the controller of a BLE system utilizing hardware, software, or combinations of hardware and software.

In operation 1401, a peer device scans for advertisements and receives from a first device an advertising packet containing information associated with a connection window when the first device will solicit a connection as a central device with the peer device as a peripheral device. In one aspect, the information is similar to that contained in a BLE connection indication (CONNECT_IND) packet, such as the window size (WinSize) and window offset (WinOffset), channel mapping (ChM), etc., of the connection window transmitted by a central device initiating a connection with a peripheral device. In one aspect, the above information may be embedded in the BLE advertising indication (ADV_IND) packet, in the BLE scan response (SCAN_RSP) packet, in the extended BLE advertising packet format, or in a new connectable advertising packet.

In operation 1403, the peer device transmits a second packet indicating an opportunity to create the connection with the peer device acting as the peripheral device with the first device. In one aspect, the peer device may transmit the second packet as the BLE scan request (SCAN_REQ) packet when the first device is known to the peer device. In one aspect, the second packet may be a connection confirmation packet that indicates that the peer device is interested in or is capable of creating a connection as the peripheral device with the first device. In one aspect, the peer device may transmit the second packet using the extended BLE advertising packet format.

In operation 1405, the peer device receives from the first device a third packet during the connection window to solicit the connection from the peer device. The peer device may determine the timing of the connection window based on the information received from the advertising packet. In one aspect, the peer device may respond to the third packet by exchanging additional packets with the first device to establish the connection in which the first device is the central device and the peer device is the peripheral device.

Various embodiments of the techniques for an BLE advertising device to create a connection as a central device to a peer device as a peripheral device described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device including an antenna, a radio frequency (RF) transceiver, a controller operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

Figure 15:
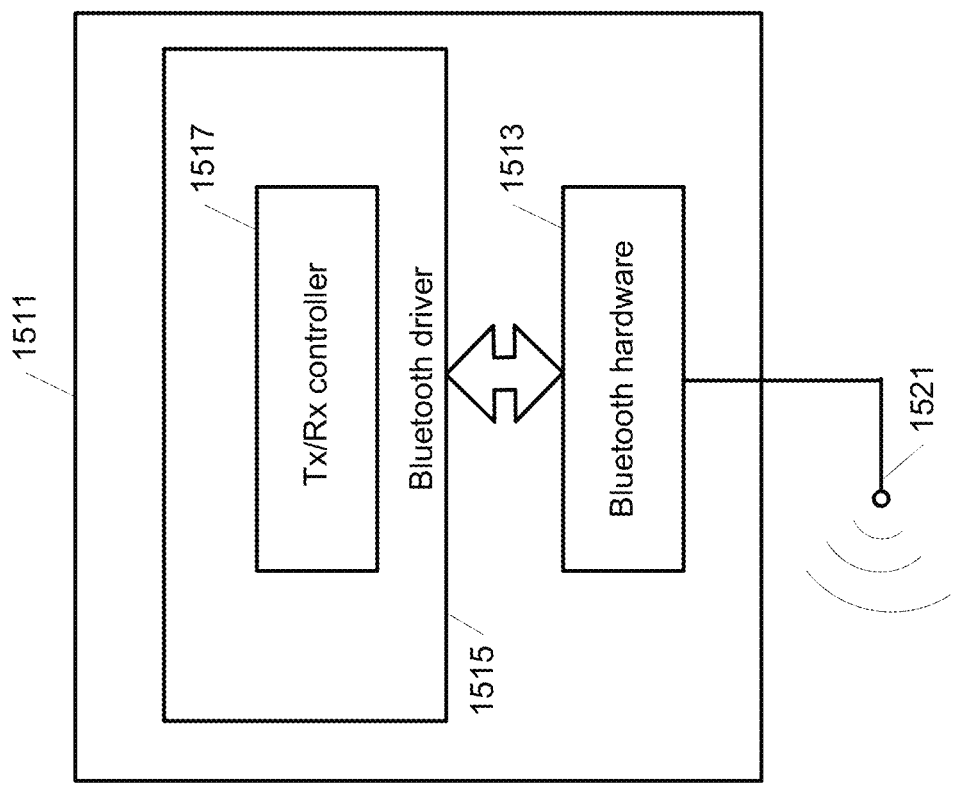
FIG. 15 is a block diagram of a Bluetooth device 1511 showing hardware and software drivers deployed to operate in a BLE link for connecting with other devices in accordance with one aspect of the present disclosure.

FIG. 15 is a block diagram of a Bluetooth device 1511 showing hardware and software drivers deployed to operate in a BLE link for connecting with other devices in accordance with one aspect of the present disclosure. The Bluetooth device 1511 may practice the protocol of FIGS. 2-10 or the operations of FIGS. 11-14.

The Bluetooth device 1511 may include one or more antennas 1521, Bluetooth hardware 1513 and Bluetooth driver 1515. The Bluetooth driver 1515 may include Bluetooth Tx/RX controller 1517. The Bluetooth hardware 1513 may include a RF transceiver configured to transmit or scan for advertising packets on advertising channels, or to transmit or receive BLE packets on an operating through the antennas 1521. The Bluetooth Tx/RX controller 1517 may be configured to generate or decode packets of the advertising events used to solicit, acknowledge, create, or establish a connection between the Bluetooth device 1511 and another device as a central device or a peripheral device of the connection as described herein.

In one embodiment, the Bluetooth device 1511 may include a memory and a processing device (e.g., Bluetooth Tx/RX controller 1517). The memory may be synchronous dynamic random access memory (DRAM), read-only memory (ROM)), or other types of memory, which may be configured to store the code to perform the function of the Bluetooth driver 1515. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for creating a connection between two devices of a communication network, comprising:
   determining, by a first device that wants to be a central device to control timing of the connection, information associated with a scan window when the first device will scan for advertisements from one or more peer devices;
   transmitting, by the first device, the information on a first advertising packet, the information associated with the scan window including services offered by the one or more peer devices the first device looks to connect;
   listening, by the first device, for a second advertising packet transmitted from one of the peer devices during the scan window; and
   receiving, by the first device, the second advertising packet to enable the first device as the central device to create the connection with the one peer device acting as a peripheral device.

2. The method of claim 1, wherein the information associated with the scan window further comprises one or more of:
   a time window when the first device will scan for the advertisements;
   an advertising channel on which the first device will scan for the advertisements; or
   characteristics of the peer devices the first device looks to connect.

3. The method of claim 1, wherein the communication network comprises a Bluetooth Low Energy (BLE) wireless network, and wherein the first advertising packet is transmitted in a legacy BLE advertising event or an extended BLE advertising packet format, and the second advertising packet is received in a BLE connectable directed event.

4. The method of claim 3, wherein the first advertising packet solicits the BLE connectable directed event from the one or more peer devices during the scan window.

5. The method of claim 1, further comprising:
   transmitting, by the first device to the one peer device, information indicating a connection window when the first device will connect with the one peer device.

6. The method of claim 1, wherein receiving the second advertising packet comprises:
   receiving, by the first device, the second advertising packet from the one peer device that offers the services the first device looks to connect.

7. The method of claim 1, wherein the communication network comprises a Bluetooth Low Energy (BLE) wireless network, and wherein the first advertising packet is transmitted in an auxiliary advertising packet in an extended BLE advertisement event.

8. A method for creating a connection between two devices of a communication network, comprising:
   receiving, by a peer device from a first device that wants to be a central device to control timing of the connection with the peer device, a first advertising packet containing scan information associated with a scan window when the first device will scan for advertisements from the peer device, the scan information associated with the scan window including services offered by one or more peer devices the first device looks to connect;

transmitting, by the peer device to the first device during the scan window, a second advertising packet containing information about the peer device; and responsive to the transmitting of the second advertising packet, receiving, by the peer device from the first device, connection information to enable the peer device to connect as a peripheral device with the first device as the central device.

9. The method of claim 8, wherein the scan information associated with the scan window further comprises one or more of:

a time window when the first device will scan for the advertisements;

an advertising channel on which the first device will scan for the advertisements; or characteristics of the peer device the first device looks to connect.

10. The method of claim 9, wherein transmitting by the peer device to the first device the second advertising packet comprises:

determining that the peer device provides the services or has the characteristics as indicated by the scan information before transmitting the second advertising packet.

11. The method of claim 8, wherein the connection information indicates a connection window when the peer device as the peripheral device will receive a packet from the first device.

12. The method of claim 11, further comprising:

receiving, by the peer device from the first device, a connection event during the connection window.

13. The method of claim 8, wherein the communication network comprises a Bluetooth Low Energy (BLE) wireless network, and wherein the first advertising packet is received in a legacy BLE advertising event or an extended BLE advertising packet format, and the second advertising packet is transmitted in a BLE connectable directed event.

14. An apparatus, comprising:

one or more antennas;

a wireless transceiver coupled to the antennas to transmit or receive a plurality of packets over a communication network;

a processing device configured to:

determine that the apparatus acts as a central device to control timing of connections between the apparatus and one or more peer devices;

determine information associated with a scan window when the apparatus will scan for advertisements from the one or more peer devices;

transmit the information on a first advertising packet, the information associated with the scan window including services offered by the one or more peer devices the apparatus looks to connect;

listen for a second advertising packet transmitted from one of the peer devices during the scan window; and receive the second advertising packet to enable the apparatus as the central device to create the connection with the one peer device acting as a peripheral device.

15. The apparatus of claim 14, wherein the information associated with the scan window further comprises one or more of:

a time window when the apparatus will scan for the advertisements;

an advertising channel on which the apparatus will scan for the advertisements; or characteristics of the peer devices apparatus looks to connect.

16. The apparatus of claim 14, wherein the communication network comprises a Bluetooth Low Energy (BLE) wireless network, and wherein the first advertising packet is transmitted in a legacy BLE advertising event or an extended BLE advertising packet format, and the second advertising packet is received in a BLE connectable directed event.

17. The apparatus of claim 16, wherein the first advertising packet solicits the BLE connectable directed event from the one or more peer devices during the scan window.

18. The apparatus of claim 14, wherein the processing device is further configured to:

transmit, to the one peer device, information indicating a connection window when the apparatus will connect with the one peer device.

19. The apparatus of claim 14, wherein to receive the second advertising packet, the processing device is further configured to:

receive the second advertising packet from the one peer device that offers the services the apparatus looks to connect.

20. The apparatus of claim 14, wherein the communication network comprises a Bluetooth Low Energy (BLE) wireless network, and wherein the first advertising packet is transmitted in an auxiliary advertising packet in an extended BLE advertisement event.

* * * * *